(12) United States Patent
Chen

(10) Patent No.: US 7,884,761 B2
(45) Date of Patent: Feb. 8, 2011

(54) METHOD FOR TRACKING SATELLITE SIGNAL BY GPS

(75) Inventor: Hung-Sheng Chen, Taipei County (TW)

(73) Assignee: Altek Corporation, Hsinchu (TW)

( * ) Notice: Subject to any disclaimer, the term of this patent is extended or adjusted under 35 U.S.C. 154(b) by 54 days.

(21) Appl. No.: 12/429,732

(22) Filed: Apr. 24, 2009

(65) Prior Publication Data

US 2010/0164796 A1 Jul. 1, 2010

(30) Foreign Application Priority Data

Dec. 31, 2008 (TW) .............................. 97151810 A

(51) Int. Cl.
  *G01S 19/24* (2010.01)
  *G01S 19/29* (2010.01)
  *G01S 19/30* (2010.01)
  *G01S 19/37* (2010.01)
(52) U.S. Cl. ............................. 342/357.63; 342/357.68; 342/357.69; 342/357.77
(58) Field of Classification Search ............ 342/357.15, 342/357.63, 357.68, 357.69, 357.77
  See application file for complete search history.

(56) References Cited

U.S. PATENT DOCUMENTS 5,917,864 A * 6/1999 Asahara ...................... 375/344
6,687,290 B1 * 2/2004 Okazaki ...................... 375/226
7,453,926 B2 * 11/2008 Chen et al. ................... 375/149
7,499,485 B2 * 3/2009 Cho ............................ 375/150
7,579,985 B2 * 8/2009 Gobara .................. 342/357.12

* cited by examiner

*Primary Examiner*—Thomas H Tarcza
*Assistant Examiner*—Cassi Galt
(74) *Attorney, Agent, or Firm*—Tim Tingkang Xia; Morris, Manning & Martin, LLP

(57) ABSTRACT

A method for tracking a satellite signal by a GPS includes the following steps. Data is continuously received from one of satellites by using tracking frequencies updated one by one based on an average phase difference of received data. Phase inversion points in the plurality of received data are interpreted. A time difference between each two adjacent phase inversion points among the phase inversion points is calculated. It is determined whether each time difference is an integral multiple of 20 ms. When each time difference is an integral multiple of 20 ms, 1-bit data is retrieved for every 20 ms from the satellite signal by taking a first phase inversion point among the plurality of phase inversion points as a starting point. Thus, a positioning speed is increased and a required positioning time is reduced by finding out a precise tracking frequency and a correct phase inversion point.

14 Claims, 5 Drawing Sheets

METHOD FOR TRACKING SATELLITE SIGNAL BY GPS

CROSS-REFERENCE TO RELATED APPLICATIONS

This non-provisional application claims priority under 35 U.S.C. §119(a) on Patent Application No(s). 097151810 filed in Taiwan, R.O.C. on Dec. 31, 2008 the entire contents of which are hereby incorporated by reference.

BACKGROUND OF THE INVENTION

1. Field of the Invention

The present invention relates to a method for tracking a satellite signal, and more particularly, to a method for tracking a satellite signal by a global positioning system (GPS).

2. Related Art

A global positioning system (GPS) is a medium-range circular-orbit satellite navigation system, which can provide accurate positioning, velocity measurement, and high-precision time standards for most areas (98%) on the surface of the earth. The GPS is developed and maintained by the U.S. Department of Defense for fulfilling the demands of continuously and accurately determining three-dimensional positions, three-dimensional movements, and time for a military user at any place all over the world or in the near-earth space. The system includes 24 GPS satellites in space, 1 master control station, 3 data upload stations and 5 monitor stations, as well as a GPS receiver serving as a user terminal on the earth. Only 4 satellites are needed at least to determine a position and an altitude of the user terminal on the earth rapidly. The larger the number of connected satellites is, the more precise the decoded position is.

Thanks to the features of being free from weather conditions, a high global coverage rate (98%), and moveable positioning, in addition to military applications, the GPS is also widely used for civilian navigation (for example, airplane navigation, ship navigation, and vehicle navigation, etc.) and positioning (for example, vehicle antitheft, positioning of mobile communication devices), etc.

As the satellite orbits the earth, after the GPS has received satellite signals sent from the satellite, the intensities of satellite signals received by the GPS may vary corresponding to a different position of the satellite. For example, when the satellite is right above the GPS, the signal has a higher intensity. When the satellite is close to the ground, the signal has a lower intensity. Meanwhile, the satellite signals may also be deteriorated due to being interfered by other electromagnetic radiations, such that the GPS suffers from a poor signal receiving effect. Meanwhile, according to the Doppler's Law, the signals sent from the satellite may be influenced by a relative movement between the GPS and the satellite or other interference factors, and as a result, the frequency of the satellite signal received by the GPS and that of the signal sent by the satellite may have a slight frequency variation.

Accordingly, in order to receive satellite signals precisely, a GPS uses a plurality of tracking frequencies in a given frequency range to detect a satellite, so as to receive satellite signals sent by the satellite. Furthermore, a phase difference obtained from a previous navigation data is used to correct the current tracking frequency, so as to obtain a next tracking frequency. In other words, a phase difference of a single data is iterated to approximate the tracking frequency.

But under the circumstances that the satellite signal is weak or there are excessively large noise interferences, the phase difference of the single navigation data fails to reflect the actual frequency changes, and thus, no matter how many times the tracking frequency is corrected, the precise tracking frequency cannot be obtained.

A satellite broadcasts 1-bit ephemeris data every 20 ms, and then a navigation data is presented by converting a satellite signal into a binary digital signal formed by 0 and 1 through inverting a phase angle (180 degrees) of the satellite signal. That is to say, in a satellite signal, a time interval between phase inversion points is a multiple of 20 ms. But as the satellite orbits the earth, after the GPS has received satellite signals sent from the satellite, the intensities of satellite signals received by the GPS may vary corresponding to a different position of the satellite. For example, when the satellite is right above the GPS, the signal has a higher intensity. When the satellite is close to the ground, the signal has a lower intensity. Meanwhile, the satellite signals may also be deteriorated due to being interfered by other electromagnetic radiations, such that the GPS suffers from a poor signal receiving effect. Thus, under the circumstances that the satellite signal is weak or there are excessively large noise interferences, the satellite signal received by the GPS may have phase inversion points that are not spaced apart by a time interval of multiples of 20 ms due to the interferences. Accordingly, a misjudgment occurs when the GPS analyzes the satellite signal. Thus, it requires a repeated and time-consuming process for receiving satellite signals again for positioning, so that the time spent on correctly positioning is prolonged.

SUMMARY OF THE INVENTION

Accordingly, the present invention is a method for tracking a satellite signal by a global positioning system (GPS), which can avoid the problem that a precise tracking frequency and a correct phase inversion point cannot be obtained due to the influences caused by satellite signals with low intensities or caused by noises, and as a result, the time spent on correctly positioning is prolonged.

The method for tracking the satellite signal by the GPS provided according to the present invention comprises the following steps. A plurality of data is continuously received from one of a plurality of satellites. A subsequent plurality of data is received from the satellite at a new tracking frequency and a plurality of phase inversion points of the plurality of received data is interpreted. A time difference between each two adjacent phase inversion points among the plurality of phase inversion points is calculated. It is determined whether each time difference is an integral multiple of 20 ms. When each time difference is an integral multiple of 20 ms, 1-bit data is retrieved for every 20 ms from the satellite signal by taking a first phase inversion point among the plurality of interpreted phase inversion points as a starting point.

The step of continuously receiving the plurality of data from one of the plurality of satellites comprises the following steps: retrieving a phase difference of each of the plurality of data (Step 1); calculating an average phase difference of the plurality of calculated phase differences (Step 2); calculating a frequency difference by using the calculated average phase difference and a frequency constant (Step 3); and calculating a new tracking frequency by using the calculated frequency difference and a tracking frequency of a last data among the plurality of received data (Step 4).

The method for tracking the satellite signal by the GPS provided according to the present invention further comprises the following steps: receiving a next data at the calculated new tracking frequency, and calculating a phase difference of the next data (Step 5); and returning to Step 2 and subsequently performing Step 2 to Step 5 after the next data is received (Step 6).

Furthermore, Step 1 may comprise calculating the plurality of phase differences of a last given number of data among the plurality of received data. Step 3 may comprise calculating a product of the calculated average phase difference and the frequency constant to obtain a frequency difference. Step 4 may comprise calculating a sum of the calculated frequency difference and a tracking frequency of a last data among the plurality of received data to obtain a new tracking frequency.

When each time difference is an integral multiple of 20 ms, the step of retrieving 1-bit data for every 20 ms from the satellite signal by taking the first phase inversion point among the plurality of phase inversion points as a starting point comprises summing up the data of each 1 ms once every 20 ms. When each time difference is not an integral multiple of 20 ms, satellite signals are continuously received from another satellite of the plurality of satellites.

The step of interpreting the plurality of phase inversion points of the received satellite signal comprises interpreting the received satellite signal to obtain more than 20 phase inversion points or interpreting the received satellite signal to obtain a plurality of phase inversion points within a time range. The time range may be 1 second, 2 seconds, or another time range.

The step of interpreting the plurality of phase inversion points of the received satellite signal comprises interpreting the received satellite signal to obtain more than 20 phase inversion points or interpreting the received satellite signal to obtain a plurality of phase inversion points within a time range. The time range may be 1 second, 2 seconds, or another time range.

Each phase inversion point is a point for inverting from logic 0 to logic 1 or from logic 1 to logic 0. A time interval between two adjacent phase differences among the plurality of phase differences may be 1 ms. The frequency constant may be 159.155.

In the method for tracking the satellite signal by the GPS according to the present invention, first, a plurality of data is continuously received from one of a plurality of satellites by using tracking frequencies updated one by one based on an average phase difference of received data, so as to obtain an average phase difference of the plurality of data, and a new tracking frequency is calculated by using the average phase difference. Subsequently, a plurality of phase inversion points of the plurality of data is interpreted, and then it is calculated whether a time difference between each two adjacent phase inversion points among the plurality of phase inversion points is an integral multiple of 20 ms. When each time difference between each two adjacent phase inversion points is an integral multiple of 20 ms, a correct phase inversion point of the GPS signal is obtained. Then, a correct navigation data in the satellite signal is obtained by summing up a single data of each 1 ms in the satellite signal once every 20 ms by taking the first phase inversion point as a starting point. Through the method for tracking the satellite signal by the GPS in the present invention, in the case of the influences caused by satellite signals with low intensities or caused by intense noises, a precise tracking frequency and a correct phase inversion point can still be obtained, so as to increase a positioning speed and reduce the time required for positioning.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

Figure 1:
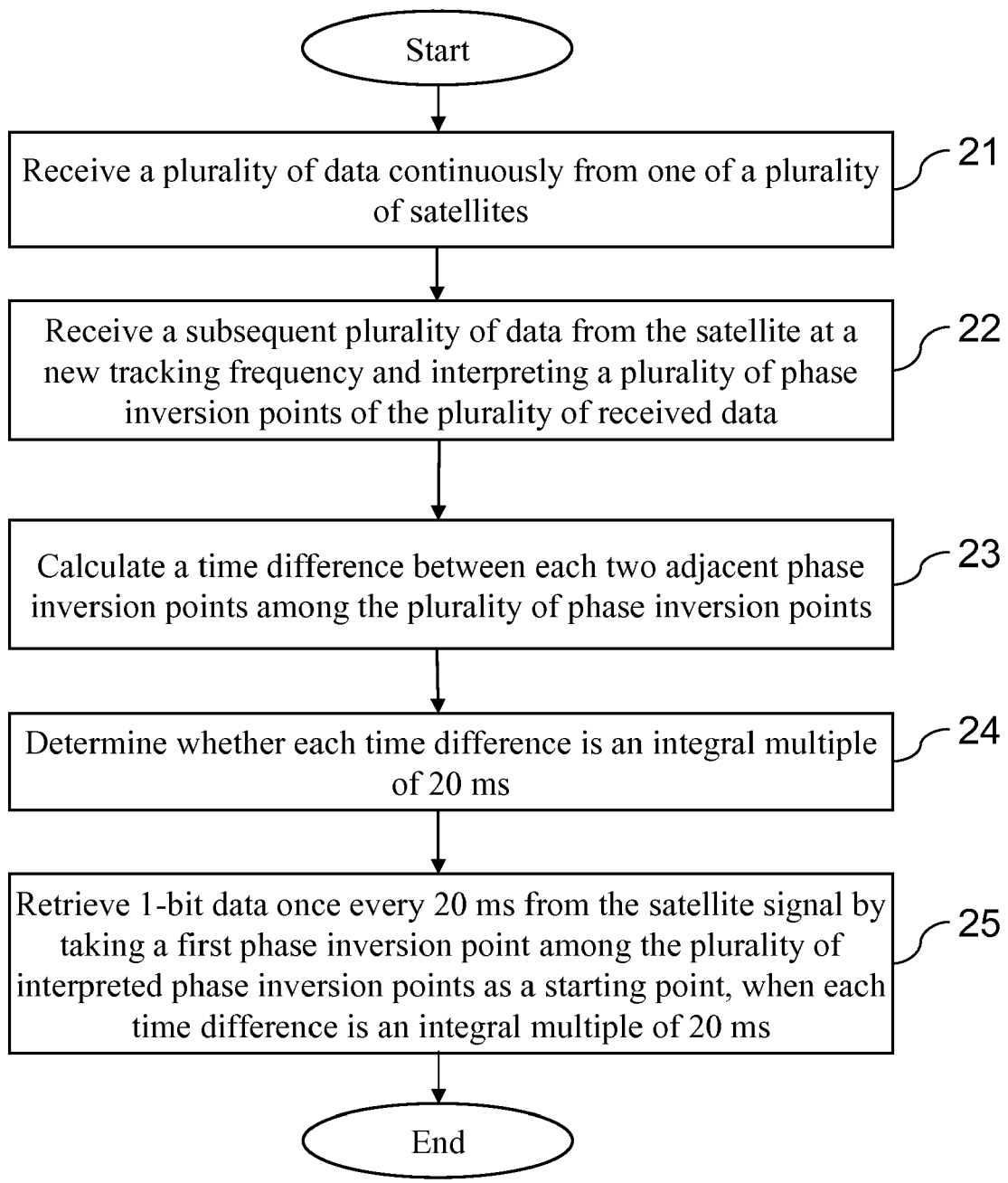
FIG. 1 is a flow chart of a method for tracking a satellite signal by a GPS according to the present invention.

FIG. 1 is a flow chart of a method for tracking a satellite signal by a GPS according to the present invention.

Referring to FIG. 1, the method for tracking the satellite signal by the GPS comprises the following steps. A plurality of data is continuously received from one of a plurality of satellites (Step 21). A subsequent plurality of data is received from the satellite at a new tracking frequency, and a plurality of phase inversion points of the plurality of received data is interpreted (Step 22). A time difference between each two adjacent phase inversion points among the plurality of phase inversion points is calculated (Step 23). It is determined whether each time difference is an integral multiple of 20 ms (Step 24). When each time difference is an integral multiple of 20 ms, 1-bit data is retrieved for every 20 ms from the plurality of data by taking a first phase inversion point among the plurality of interpreted phase inversion points as a starting point (Step 25).

Figure 2:
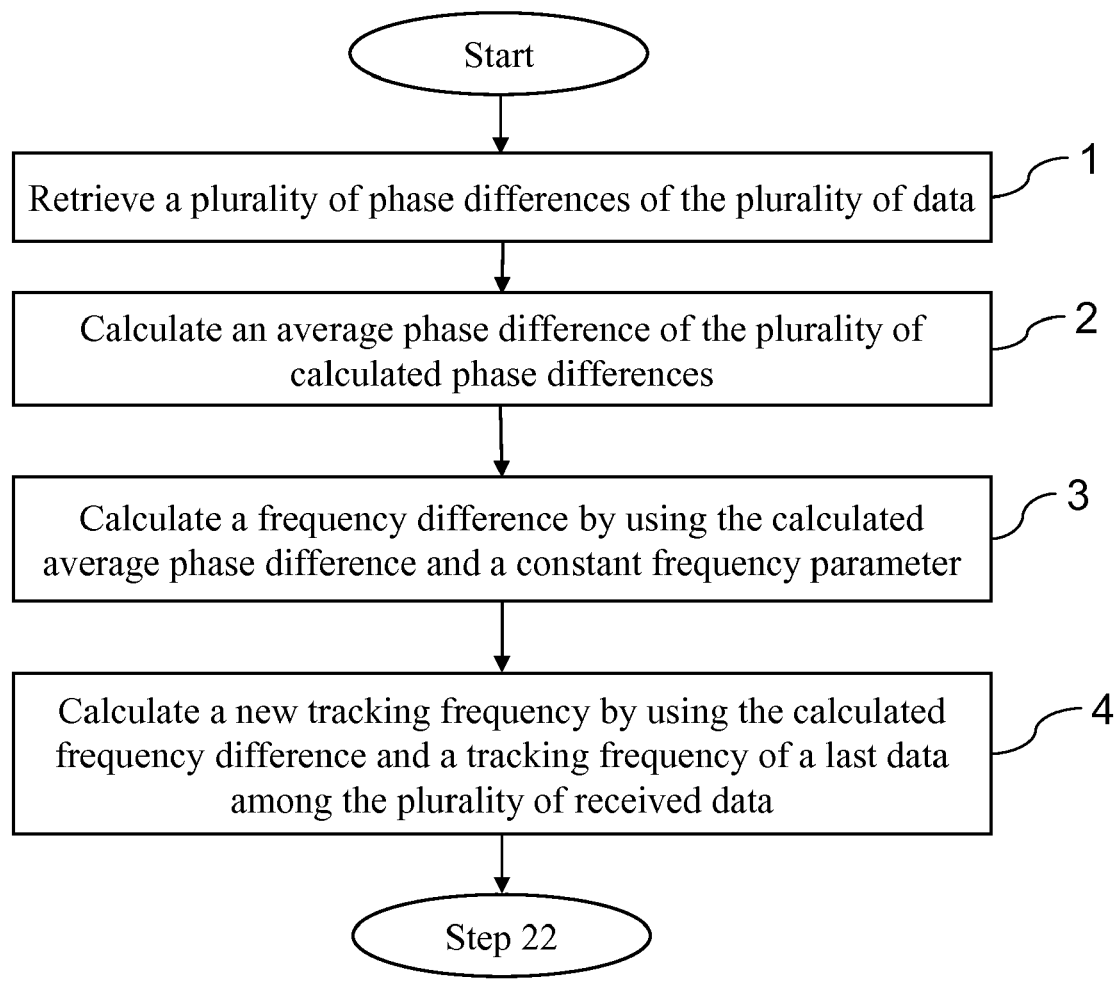
FIG. 2 is a flow chart of a process for continuously receiving a plurality of data from one of a plurality of satellites according to a first embodiment of the present invention.

Referring to FIG. 2, the process for continuously receiving the plurality of data from one of the plurality of satellites in Step 21 may comprise the following steps: calculating a plurality of phase differences of the plurality of received data (Step 1); calculating an average phase difference of the plurality of calculated phase differences (Step 2); calculating a frequency difference by using the calculated average phase difference and a frequency constant (Step 3); and calculating a new tracking frequency by using the calculated frequency difference and a tracking frequency of a last data among the plurality of received data (Step 4).

As the satellite orbits the earth, when a GPS is receiving satellite signals sent from the satellite, the intensities of the satellite signals received by the GPS might vary as the position of the satellite changes. For example, when the satellite is right above the GPS, the atmospheric layer where the signal passes through is relatively thin, so that the signal has a higher intensity. When the satellite is close to the ground, the atmospheric layer where the signal passes through is relatively thick, so that the signal may have a lower intensity. Meanwhile, the satellite signals may also be interfered by other electromagnetic radiations, and as a result, the GPS suffers from a poor signal receiving effect. According to Doppler's Law, the signals sent by the satellite may be influenced by a relative movement between the GPS and the satellite or other interference factors, so that the frequency of the satellite signal received by the GPS and that of the signal sent by the satellite may have a slight frequency variation.

Accordingly, in order to receive data carried in the satellite signals precisely, a GPS uses a plurality of tracking frequencies in a given frequency range to detect a satellite, so as to receive satellite signals from the satellite. The satellite can be detected at all the plurality of tracking frequencies in the given frequency range. However, only the tracking frequency where the most intense satellite signal is received is the frequency that is most approximate to that of the satellite signal influenced by the Doppler Effect.

Thus, the method for obtaining the precise tracking frequency of the GPS signal according to the present invention comprises the following steps. In Step 1, first, a given frequency range is adopted for searching satellites (for example, when three satellites are found, a longitude and a latitude of a position of the GPS can be acquired; when four satellites are found, the longitude, the latitude, as well as an altitude of the GPS can be acquired). After the GPS has searched the satellites, satellite signals sent by the satellites are continuously received at a tracking frequency where a satellite signal with the greatest intensity is received, so as to obtain a plurality of navigation data.

The GPS retrieves a plurality of phases (for example, $\theta 1$, $\theta 2$, $\theta 3$, ... and $\theta n$) every 20 ms. Next, a plurality of phase differences of the plurality of data is retrieved (Step 1). For example, the plurality of phase differences (for example, n phase differences) may be $d\theta 1$, $d\theta 2$, $d\theta 3$, ... and $d\theta n$, where $d\theta 1=\theta 2-\theta 1, d\theta 2=\theta 3-\theta 2, d\theta 3=\theta 4-\theta 3, \ldots$ and $d\theta n=\theta n+1-\theta n$. Then, the calculated phase differences are added and then divided by the number of the plurality of phase differences to obtain the average phase difference (Step 2). The calculation equation is listed as follows:

$$d\theta=(d\theta 1+d\theta 2+d\theta 3+ \ldots +d\theta n)/n$$

In this embodiment, the average phase difference for correcting a tracking frequency is calculated by using the plurality of data, such that the influences caused by the noises are greatly reduced, so as to obtain a more precise tracking frequency and observe a frequency variation trend.

The process of calculating the phase differences comprises calculating the phase differences of a last given number of data among the plurality of received data, in which the last given number of data may be the last two data, the last three data, or the last more than four data.

The number of data used for calculating the average phase difference may be set when the GPS leaves the factory, or may also be set by the user definitely. If the total number of the given number of data is too small, due to the influences caused by satellite signals with low intensities or intense noises, a misjudgment is still possible. If the total number of the given number of data is too large, the time required for positioning may be prolonged, which may possibly cause an additional load to the system. Thus, the given number of data that is taken may be decided according to the intensity of the satellite signal received by the GPS. In other words, the number of data that is taken may be decided according to an application area of the GPS.

A time interval between each two adjacent phase differences may be 1 ms. In other words, a time period for each data is 1 ms.

Next, in Step 3, a product of the average phase difference and the frequency constant (Constant) is calculated to obtain a frequency difference. When the time interval for continuously receiving the plurality of data is 1 ms (that is, the obtained time interval between each two adjacent phase differences is 1 ms), the frequency constant (Constant) may be 159.155. The equation for calculating the frequency difference is as follows:

$$\text{Frequency difference}=d\theta * \text{Constant}$$

Then, a sum of the frequency difference and the tracking frequency of the last data among the plurality of received data is calculated, so as to obtain the new tracking frequency (Step 4), which is calculated as follows:

$$\text{New tracking frequency}=\text{Tracking frequency of the last data}+\text{Frequency difference}$$

The above manner for calculating the new tracking frequency is merely intended to facilitate the illustrations of this embodiment, and definitely other manners may be adopted for calculating the new tracking frequency, which are not limited herein.

Figure 3:
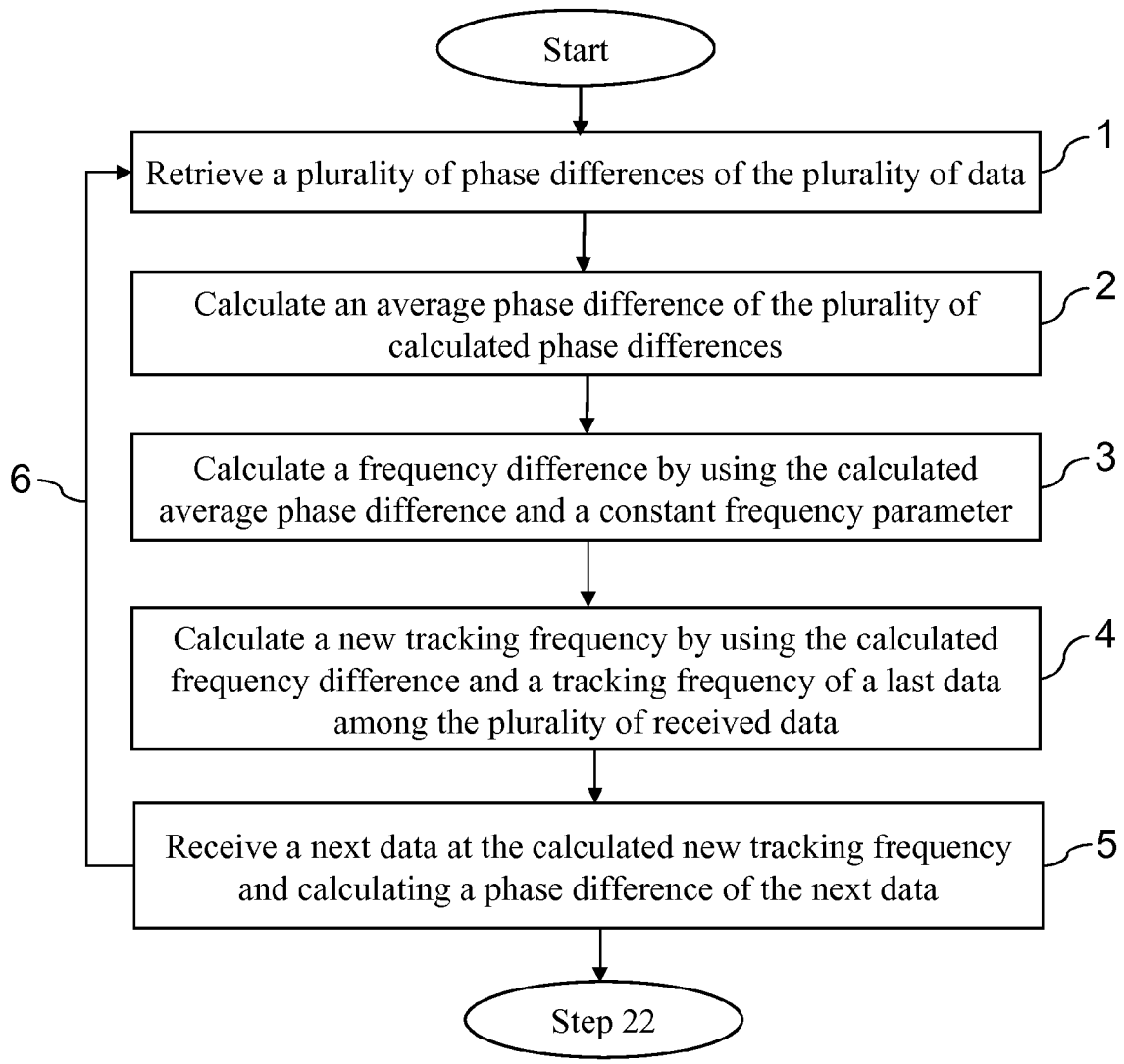
FIG. 3 is a flow chart of a process for continuously receiving a plurality of data from one of a plurality of satellites according to a second embodiment of the present invention.

Finally, a satellite signal is received at the new tracking frequency again to receive a next data, and Step 1 to Step 5 are repeated for the received data and the plurality of previously received data to obtain a new tracking frequency. Referring to FIG. 3, with reference to the above embodiment, the process for continuously receiving the plurality of data from one of the plurality of satellites in Step 21 further comprises: receiving a next data at the calculated new tracking frequency, and calculating a phase difference of the next data (Step 5); and returning to Step 2 and subsequently performing Step 2 to Step 5 after the next data is received (Step 6).

In this embodiment, an average phase difference of a last given number of data may be calculated repeatedly and continuously. Then, a new tracking frequency may be obtained again by using the calculated average phase difference, a frequency constant, and a tracking frequency of a last data. Then, a next data is received at the new tracking frequency, and thus each time when a data is received, a tracking frequency of the next data is calculated once again. In other words, the precise tracking frequency is hereby approximated through a plurality of iterations of the frequency differences obtained according to the phase differences of the plurality of data, so that the influences caused by the satellite signals with low intensities or intense noises can be avoided, thereby achieving the precise tracking frequency.

For the ease of illustrations, an example of calculating the last 5 data is provided herein.

In Step 21, when a GPS is turned on, first, a satellite is detected at a plurality of tracking frequencies in a given frequency range, so as to obtain a plurality of satellite signals. Next, a tracking frequency of a satellite signal with the greatest energy response among the plurality of obtained satellite signals in this given frequency range is taken as an initial tracking frequency. Then, the satellite signal from the satellite is received at the initial tracking frequency to obtain a first data. Then, a phase difference of the first data is calculated. Then, a product of the phase difference of the first data and a frequency constant is calculated to obtain a first frequency difference. Next, a sum of the first frequency difference and the initial tracking frequency is calculated to obtain a second tracking frequency. Then, a satellite signal from the satellite is received at the second tracking frequency to obtain a second data.

After the second data is obtained, by means of calculating a sum of a last data and a product of the average phase difference of the received data and the frequency constant, a tracking frequency of a next data is obtained. A new tracking frequency is calculated repeatedly in this way, until a fifth data is obtained.

In other words, after the second data is obtained, by calculating a sum of the tracking frequency of the second data and a product of an average phase difference of the first data and the second data and the frequency constant, a third tracking frequency is obtained. Meanwhile, a satellite signal from the satellite is received at the third tracking frequency, so as to obtain a third data.

After the third data is received, by calculating a sum of the third tracking frequency and a product of an average phase difference of the first data, the second data, and the third data and the frequency constant, a fourth tracking frequency is obtained. Furthermore, a satellite signal from the satellite is received at the obtained fourth tracking frequency, so as to obtain a fourth data.

After the fourth data is received, by calculating a sum of the fourth tracking frequency and a product of an average phase difference of the first data, the second data, the third data, and the fourth data and the frequency constant, a fifth tracking frequency is obtained. Furthermore, a satellite signal from the satellite is received at the obtained fifth tracking frequency, so as to obtain a fifth data.

After the fifth data is received, by calculating a sum of the fifth tracking frequency and a product of an average phase difference of the first data, the second data, the third data, the fourth data, and the fifth data and the frequency constant, a sixth tracking frequency is obtained. Furthermore, a satellite signal from the satellite is received at the obtained sixth tracking frequency, so as to obtain a sixth data.

Next, after the sixth data is received, by calculating a sum of the last data and a product of an average phase difference of the last received five data and the frequency constant, a tracking frequency of a next data is obtained. A new tracking frequency is calculated repeatedly in this way, so as to update a tracking frequency of a subsequent data.

In other words, after the sixth data is received, by calculating a sum of a sixth tracking frequency and a product of an average phase difference of the second data, the third data, the fourth data, the fifth data, and the sixth data and the frequency constant, a seventh tracking frequency is obtained. Furthermore, a satellite signal from the satellite is received at the obtained seventh tracking frequency, so as to obtain a seventh data.

After the seventh data is received, by calculating a sum of a seventh tracking frequency and a product of an average phase difference of the third data, the fourth data, the fifth data, the sixth data, and the seventh data and the frequency constant, an eighth tracking frequency is obtained. Furthermore, a satellite signal from the satellite is received at the obtained eighth tracking frequency, so as to obtain an eighth data, and so forth.

Here, an average phase difference is obtained by using the plurality of received data. Next, a frequency difference is calculated by using the average phase difference and the frequency constant. Then, a new tracking frequency is calculated by using the frequency difference and a tracking frequency of a last data, so that the next data is received at the new tracking frequency. In such a manner, the interferences resulted from noises are greatly reduced, so as to obtain a most precise tracking frequency and observe a frequency variation trend.

First, in Step 21, through continuously updating the tracking frequency for each 1 ms, the plurality of data is obtained from one of the plurality of satellites by using a precise tracking frequency, and then a plurality of phase inversion points of the plurality of received data is interpreted.

Figure 4:
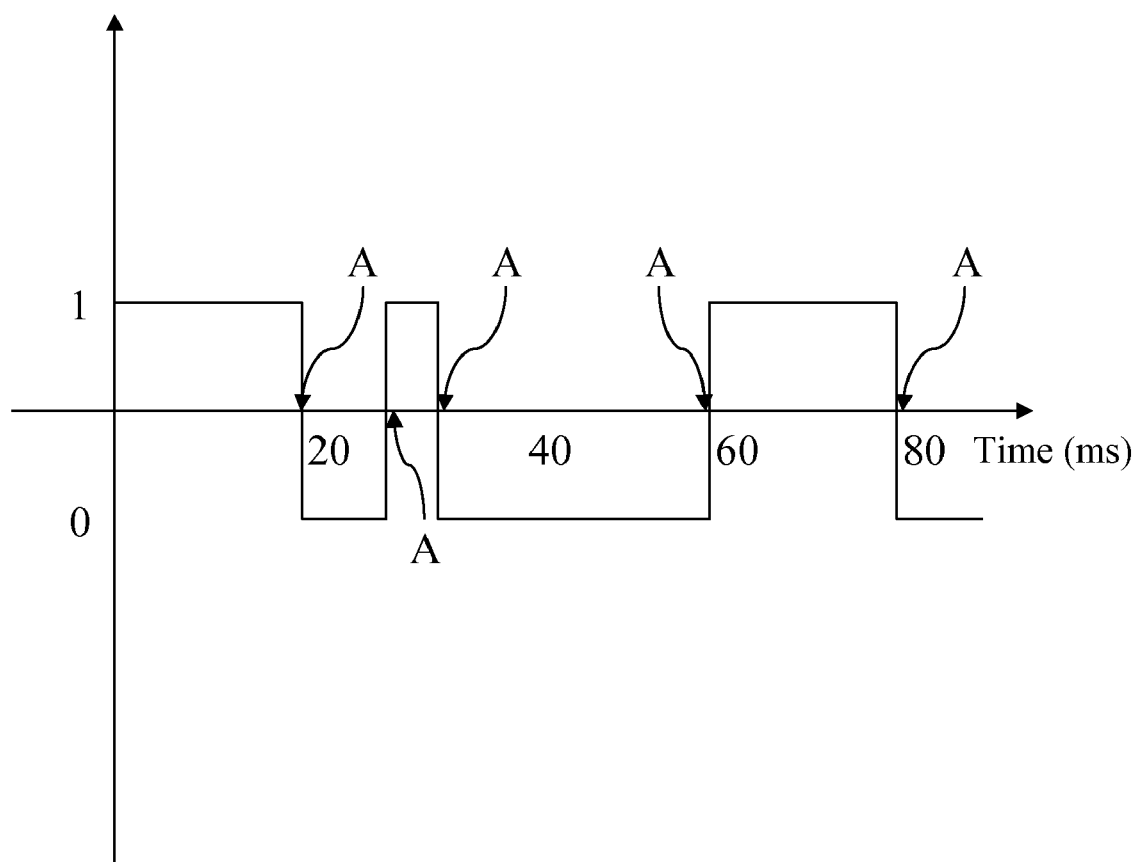
FIG. 4 is a schematic view of a satellite signal with each time difference between phase inversion points not being 20 ms according to the present invention.

Next, in Step 22, after continuously receiving the plurality of data from one of the plurality of satellites (Step 21), a subsequent plurality of data is received from the satellite at the new tracking frequency, and a plurality of phase inversion points A of the plurality of received data is interpreted (as shown in FIG. 4). Referring to FIG. 4, the plurality of data is converted into binary digital signals formed by 0 and 1 through phase inversion. As shown in FIG. 4, a plurality of switching points between a digital signal 1 and a digital signal 0 exists in the plurality of data, that is, each phase inversion point A may be inverted from logic 0 to logic 1, or from logic 1 to logic 0. Particularly, a plurality of phase inversion points of the plurality of received data within a time range may be interpreted. This time range may be 1 second, 2 seconds, or another time range. Alternatively, a particular number of phase inversion points A of the plurality of received data may be interpreted. This particular number may be 5 to 20, or may be more than 20.

In Step 23, a time difference between each two adjacent phase inversion points among the plurality of phase inversion points is calculated. As a satellite broadcasts 1-bit ephemeris data every 20 ms, that is, the satellite broadcasts 50-bit data every second. That is to say, in the satellite signal, a time interval between each two adjacent phase inversion points should be a multiple of 20 ms. However, as the satellite orbits the earth, the satellite signals received by the GPS may vary in intensity corresponding to the position of the satellite when the GPS is receiving satellite signals from the satellite.

When the satellite signals are weak or there are intense noises, the data in the satellite signal received by the GPS may have two adjacent phase inversion points where a time difference thereof is not a multiple of 20 ms. As shown in FIG. 4, when the satellite signals are rather weak or the external interfering noises are relatively intense, a plurality of phase inversion changes may occur in a time interval of 20 ms for the plurality of data in the satellite signal received by the GPS, thereby resulting in a misjudgment when the GPS analyzes the plurality of data. As a result, incorrect navigation information is received. Accordingly, a satellite signal needs to be received once again, which is a repeated and time-consuming process, such that the time required for correctly positioning is prolonged. Thus, in an embodiment, a time difference between two adjacent phase inversion points is used to decide directly whether the obtained satellite signal can be used or not. When it is determined that the obtained satellite signal can be used, each phase inversion point in the satellite signal is directly interpreted to obtain each bit of data. In such a manner, problems about satellite signal errors caused by weak satellite signals or intense external interfering noises can be avoided.

When the time difference between each two adjacent phase inversion points among the plurality of phase inversion points is calculated, the time difference between each two adjacent phase inversion points may be calculated by taking at least 5, 10, or more than 20 phase inversion points. Thus, the number of phase inversion points to be calculated may be determined according to an application area of the GPS. That is, the number or the time range of the phase inversion points to be searched may be determined according to the application area of the GPS.

In Step 24, it is determined whether the time difference between each two adjacent phase inversion points among the plurality of phase inversion points is an integral multiple of 20 ms. When each time difference is not an integral multiple of 20 ms, it indicates that the received satellite signals are rather weak or there are intense noises, and the process returns to Step 21, in which a plurality of data in a satellite signal is continuously received from another satellite of the plurality of satellites, so as to avoid continuously receiving satellite signals from the satellite with low signal intensities and prolonging the time required for correctly positioning.

Figure 5:
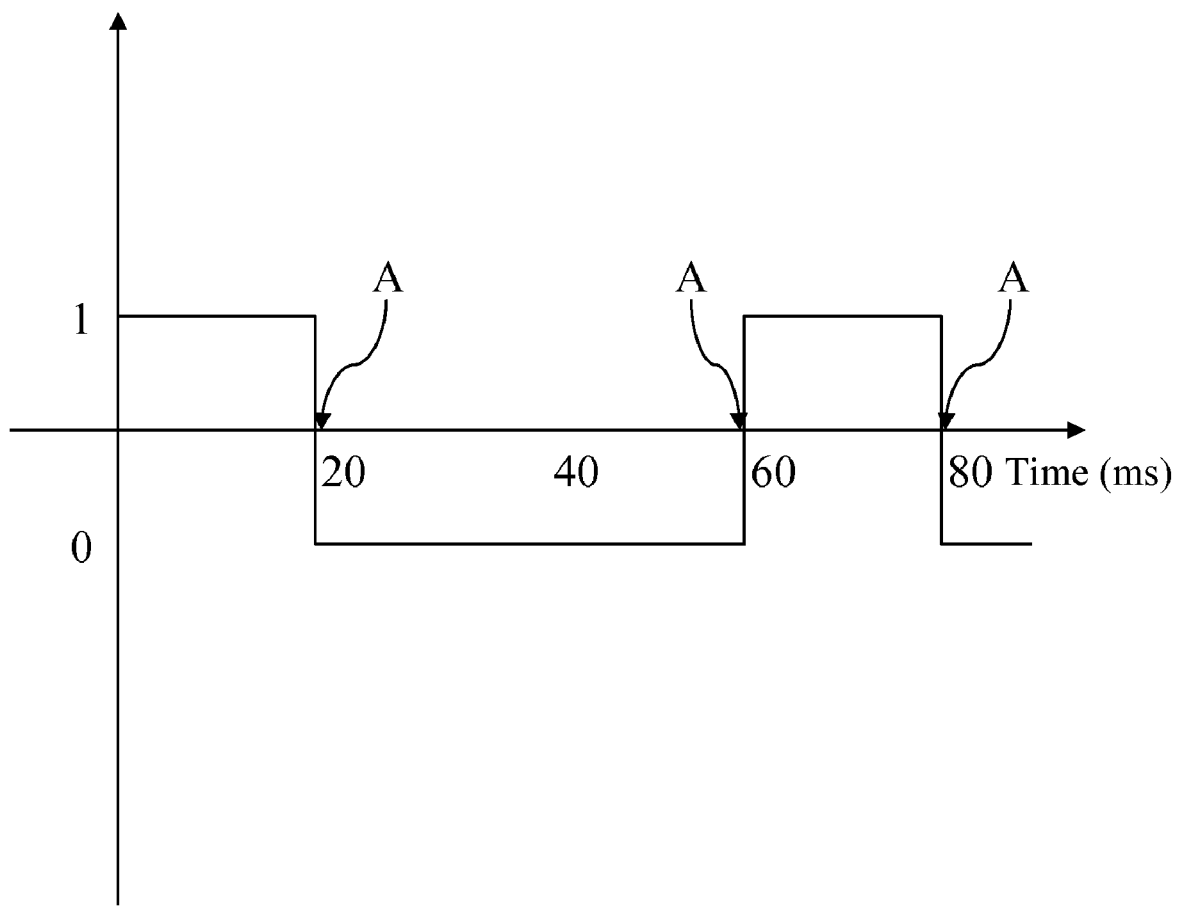
FIG. 5 is a schematic view of a satellite signal with each time difference between phase inversion points as 20 ms according to the present invention.

When it is determined that each time difference between each two adjacent phase inversion points among the plurality of phase inversion points is an integral multiple of 20 ms, that is, the obtained plurality of data has correct phase inversion points (as shown in FIG. 5, each time difference between two adjacent phase inversion points is an integral multiple of 20 ms), Step 25 is performed, so as to retrieve a navigation data from the plurality of data.

In Step 25, the data of each 1 ms starts to be summed up once every 20 ms from the plurality of data by taking a first phase inversion point among the plurality of phase inversion points as a starting point, that is, 1-bit data is retrieved once every 20 ms. As shown in FIG. 5, when each time difference between adjacent phase inversion points 20 is an integral multiple of 20 ms, the correct navigation data 10010 . . . can be obtained from the plurality of data.

Therefore, the method for tracking the satellite signal by the GPS according to the present invention can be applied in electronic devices with the GPS, for example, portable electronic devices such as cellular phones, notebook computers, or single-unit devices (for example, GPS receivers). The electronic device with the GPS may have an antenna, a storage unit, and a processor. The method for tracking the satellite signal by the GPS according to the present invention may be built in the storage unit by a software program or a firmware program. The antenna is used to receive satellite signals from a plurality of satellites. The built-in software or firmware program is then executed by the processor to perform the following operations. First, a plurality of data in the satellite signal is received. Next, an average phase difference of the plurality of data is interpreted, so as to calculate a frequency difference. Finally, the frequency difference is iterated back to a tracking frequency of the last satellite signal, so as to obtain a new tracking frequency. After the processor has received the plurality of data from the satellite, the processor interprets the plurality of phase inversion points and calculates a time difference between each two adjacent phase inversion points.

The method for tracking the satellite signal by the GPS according to the present invention is applied in the GPS. First, a plurality of data from the satellite signal is continuously received by using tracking frequencies updated one by one based on an average phase difference of received data to obtain, and an average phase difference is obtained by using the plurality of received data. Next, a frequency difference is calculated by using the average phase difference and a frequency constant. Then, a new tracking frequency is calculated by using the frequency difference and a tracking frequency of a last data, and the new tracking frequency is continuously used to receive a next data. After a satellite signal is received, a plurality of phase inversion points of the plurality of received data is interpreted, and it is calculated whether a time difference between each two adjacent phase inversion points among the plurality of phase inversion points is an integral multiple of 20 ms. When each time difference between each two adjacent phase inversion points is an integral multiple of 20 ms, a correct phase inversion point of the GPS signal is obtained. Subsequently, 1-bit data is obtained from the satellite signal once every 20 ms by taking the first phase inversion point as a starting point, so that a correct navigation data in the satellite signal is obtained. Through the method for tracking the satellite signal by the GPS in the present invention, a precise tracking frequency and a correct phase inversion point can still be obtained under the influences of weak satellite signals or intense noises, thereby increasing the speed for positioning and reducing the time required for positioning.

What is claimed is:

1. A method for tracking a satellite signal by a global positioning system (GPS), comprising:
   continuously receiving a plurality of data from one of a plurality of satellites, comprising:
   Step 1: retrieving a phase difference of each of the plurality of data;
   Step 2: calculating an average phase difference of the plurality of calculated phase differences;
   Step 3: calculating a frequency difference by using the calculated average phase difference and a frequency constant; and
   Step 4: calculating a new tracking frequency by using the calculated frequency difference and a tracking frequency of a last data among the plurality of received data;
   receiving a subsequent plurality of data from the satellite at the new tracking frequency, and interpreting a plurality of phase inversion points of the plurality of received data;
   calculating a time difference between each two adjacent phase inversion points among the plurality of phase inversion points;
   determining whether each time difference is an integral multiple of 20 ms; and
   retrieving 1-bit data for every 20 ms from the plurality of data by taking a first phase inversion point among the plurality of interpreted phase inversion points as a starting point, when each time difference is an integral multiple of 20 ms.

2. The method for tracking a satellite signal by a GPS according to claim 1, wherein the step of continuously receiving the plurality of data from one of the plurality of satellites further comprises:
   Step 5: receiving a next data at the calculated new tracking frequency, and calculating a phase difference of the next data; and
   Step 6: returning to Step 2 to perform Step 2 to Step 5 subsequently after the next data is received, and repeating the steps to update the new tracking frequency.

3. The method for tracking a satellite signal by a GPS according to claim 1, wherein a time interval between two adjacent phase differences among the plurality of phase differences is 1 ms.

4. The method for tracking a satellite signal by a GPS according to claim 1, wherein the frequency constant is 159.155.

5. The method for tracking a satellite signal by a GPS according to claim 1, wherein Step 1 further comprises:
   calculating the plurality of phase differences of a last given number of data among the plurality of received data.

6. The method for tracking a satellite signal by a GPS according to claim 2, wherein Step 1 further comprises:
   calculating the plurality of phase differences of a last given number of data among the plurality of received data.

7. The method for tracking a satellite signal by a GPS according to claim 1, wherein Step 3 further comprises:
   calculating a product of the calculated average phase difference and the frequency constant to obtain the frequency difference.

8. The method for tracking a satellite signal by a GPS according to claim 1, wherein Step 4 further comprises:

calculating a sum of the calculated frequency difference and the tracking frequency of the last data among the plurality of received data to obtain the new tracking frequency.

9. The method for tracking a satellite signal by a GPS according to claim 1, wherein each of the phase inversion points is one selected from points for inverting from logic 0 to logic 1 and points for inverting from logic 1 to logic 0.

10. The method for tracking a satellite signal by a GPS according to claim 1, wherein when each time difference is not an integral multiple of 20 ms, a plurality of data is continuously received from another satellite of the plurality of satellites.

11. The method for tracking a satellite signal by a GPS according to claim 1, wherein the step of interpreting the plurality of phase inversion points of the plurality of received data comprises interpreting the plurality of received data to obtain more than 20 phase inversion points.

12. The method for tracking a satellite signal by a GPS according to claim 1, wherein the step of interpreting the plurality of phase inversion points of the plurality of received data comprises interpreting the plurality of received data to obtain a plurality of phase inversion points within a time range.

13. The method for tracking a satellite signal by a GPS according to claim 12, wherein the time range is 1 second.

14. The method for tracking a satellite signal by a GPS according to claim 1, wherein the step of retrieving 1-bit data for every 20 ms from the plurality of data comprises summing up the data of each 1 ms once every 20 ms.

\* \* \* \* \*